United States Patent [19]

Chiang

[11] Patent Number: 5,293,792
[45] Date of Patent: Mar. 15, 1994

[54] NAIL CLAMPING DEVICE

[76] Inventor: Vance Chiang, 5 Fl., No. 412-12, 2 Sec., Chung Shan Rd., Tai Peiping, Taichung, Taiwan

[21] Appl. No.: 81,233

[22] Filed: Jun. 25, 1993

[51] Int. Cl.⁵ .............................................. B25C 3/00
[52] U.S. Cl. ........................................ 81/44; 81/416; 81/426.5
[58] Field of Search ................. 81/44, 487, 416, 426.5

[56] References Cited

U.S. PATENT DOCUMENTS 4,079,765  3/1978  Hatayan .................................. 81/44

FOREIGN PATENT DOCUMENTS

1257621  2/1961  France ..................................... 81/44

Primary Examiner—D. S. Meislin

[57] ABSTRACT

A multipurpose nail clamping device comprises two handles pivoted together and provided symmetrically with two jaws opposite to each other and having on the inner side surfaces thereof a plurality of longitudinally-arranged nail clamping grooves. The pivoting movement of the two handles is attained by means of two arcuate guide slots provided with two bolts capable of moving in opposite directions in the arcuate guide slots. Located between the two arcuate guide slots is an axial hole having a bottom of trumpetlike construction and having at the center thereof an opening forming an angle of 90 degrees. There are two locating holes at the bottom distant equally from the circumference of the axial hole and two locating pins received in the locating holes for use in locating center point of a work piece. Each of the two handles is provided at the rear end thereof with a 75-degree guide slant and a guide hole perpendicular to the guide slant for use in drilling a 15-degree bevel hole into the work piece.

7 Claims, 8 Drawing Sheets

NAIL CLAMPING DEVICE

FIELD OF THE INVENTION

The present invention relates generally to a carpenter's hand tool, and more particularly to a nail clamping device.

BACKGROUND OF THE INVENTION

Figure 1:
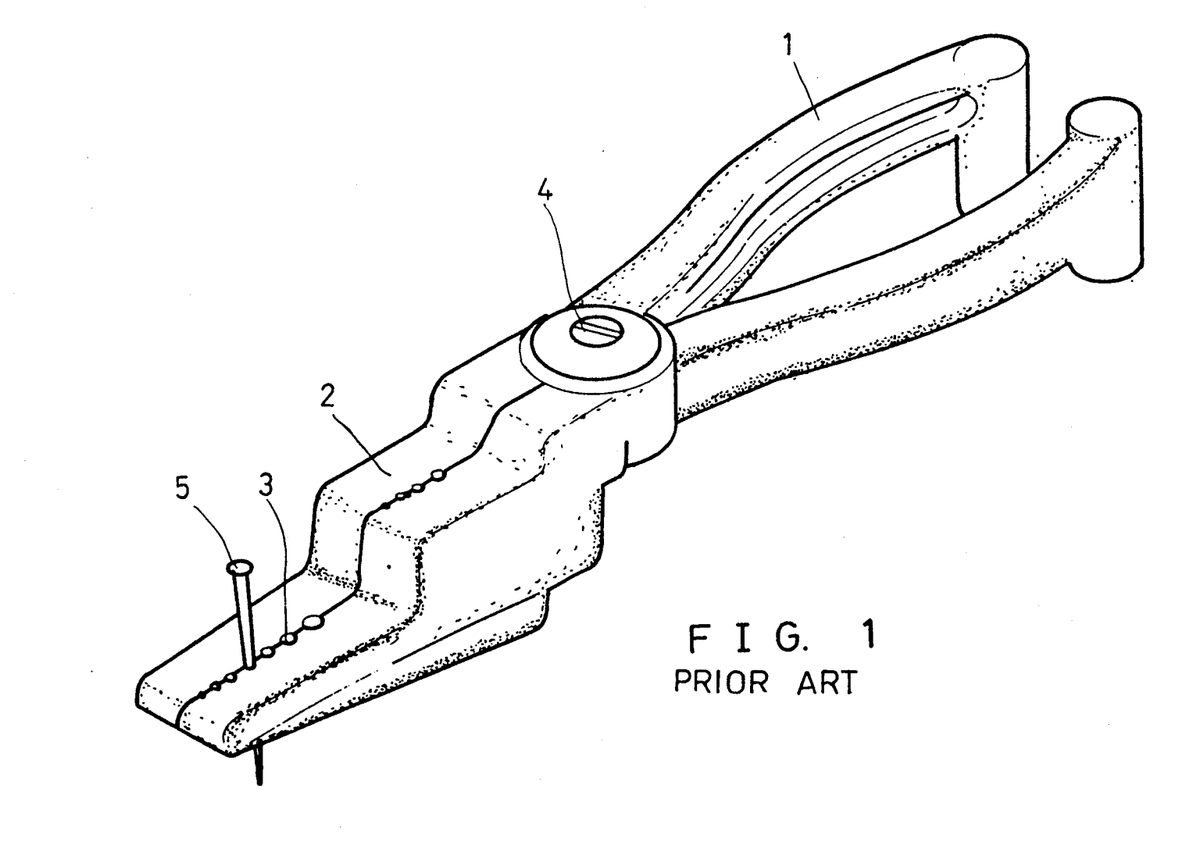
FIG. 1 shows a perspective view of a nail clamping device of the prior art.

As shown in FIG. 1, a nail clamping device of the prior art comprises mainly two handles 1 and two movable jaws 2 extending from the handles 1. Located on the two opposite inner surfaces of the movable jaws 2 are a plurality of nail-clamping grooves 3 for holding a nail 5 uprightly. The two handles 1 are fastened together by means of a bolt 4. The nail 5 is held uprightly by the movable jaws 2 so that the nail 5 can be driven with a hammer into an object in an upright manner. Such a nail clamping device of the prior art described above is a useful hand tool that is often used in the trade of carpentry of interior design. However, in addition to the chore of nailing, the workman must do some other chores such as drilling a hole in the work pieces of various shapes and dimensions. In the course of drilling a hole in the work piece, the workman is often troubled by the drill bit which can be hardly held in an upright manner, especially in a situation calling for drilling a 15-degree bevel pin hole in two vertical members of a piece of furniture. The work of drilling a hole in a diamond corner or a round rod can be done well only by a seasoned and skilled workman who is familiar with the art. It is apparent that a multifunctional hand tool for use in the trade of carpentry or interior decoration is badly needed.

SUMMARY OF THE INVENTION

It is therefore the primary objective of the present invention to provide an improved nail clamping device, which is so multifunctional that it can be used to do such chores as nailing, surveying, drilling, etc.

In keeping with the principles of the present invention, the foregoing objective of the present invention is attained by the nail clamping device, which comprises mainly two handles that are pivoted together in the middle. Each of the two handles is provided at the front end thereof with a jaw having on the inner surface thereof with a plurality of longitudinally-oriented nail clamping grooves. The two handles can be caused to move inwards or outwards on the pivot so that their jaws can work against each other to hold therebetween a nail.

The two handles of the nail clamping device of the present invention can be so moved on the pivot as to open or close by means of two arcuate guide slots which are opposite in location to each other and are provided therein with two bolts capable of moving in opposite directions. Located between the two arcuate guide slots in an axial hole into which a guide sleeve of a predetermined hole diameter is fitted. The axial hole has a bottom end of trumpetlike construction and having at the center thereof a bevel opening of 90-degree angle for use in guiding a work piece. There are two locating holes situated at the bottom end of the axial holes such that the two locating holes are opposite to each other and distant equally from the circumference of the axial hole. Received in each of the two locating holes is a locating pin for use in holding a work piece so as to allow the workman to see the center point of the work piece. The two handles are provided respectively, symmetrically and downwards at the rear ends thereof with a 75-degree guide slant having a guide hole which is perpendicular to the guide slant and which is for use in guiding the workman to make a 15-degree dilling.

The foregoing objective, features and function of the present invention can be more readily understood upon a thoughtful deliberation of the following detailed description of the present invention in conjunction with the accompanying drawings.

DETAILED DESCRIPTION OF THE INVENTION

Figure 2:
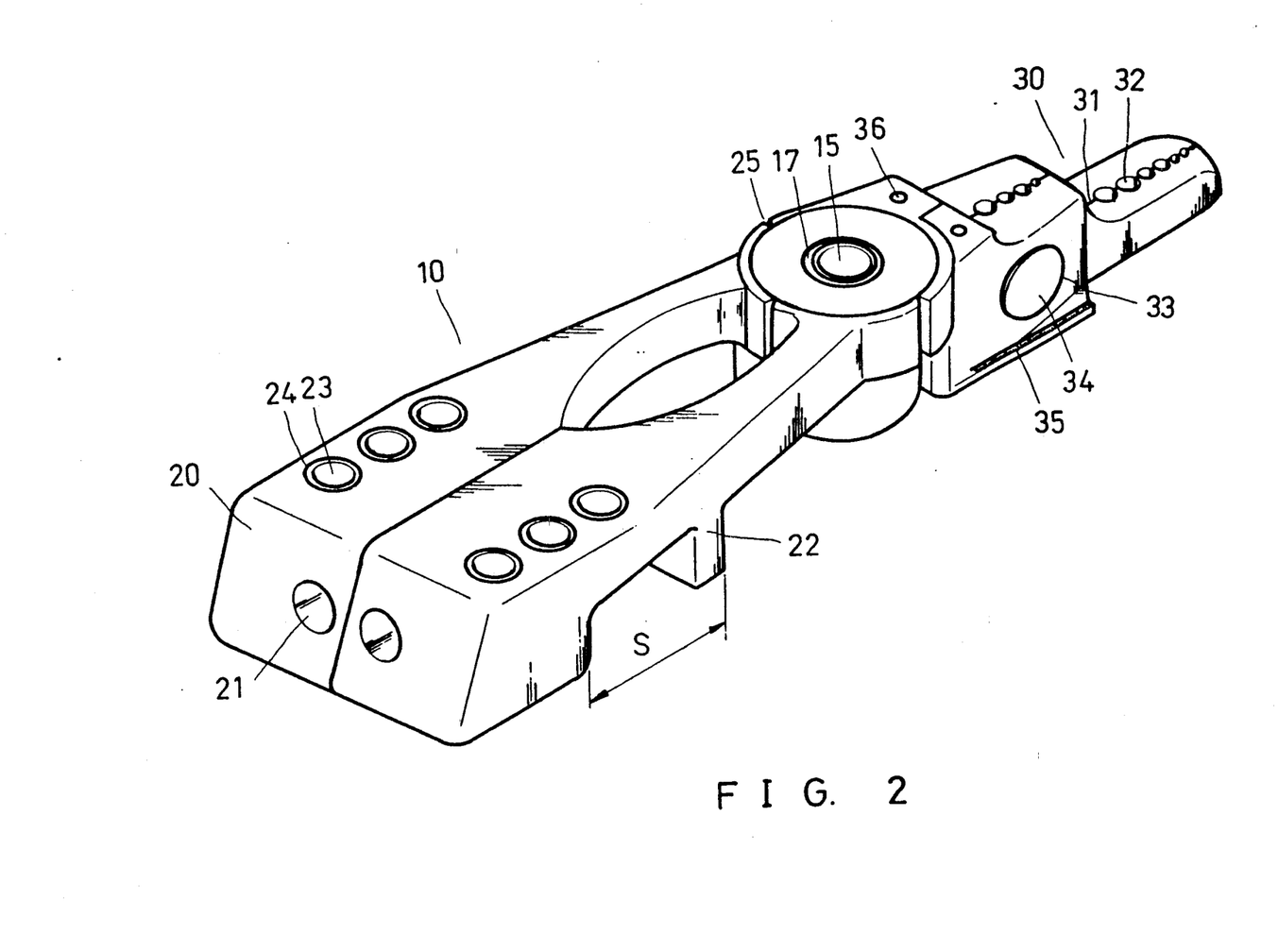
FIG. 2 shows a perspective view of a nail clamping device embodied in the present invention.
Figure 3:
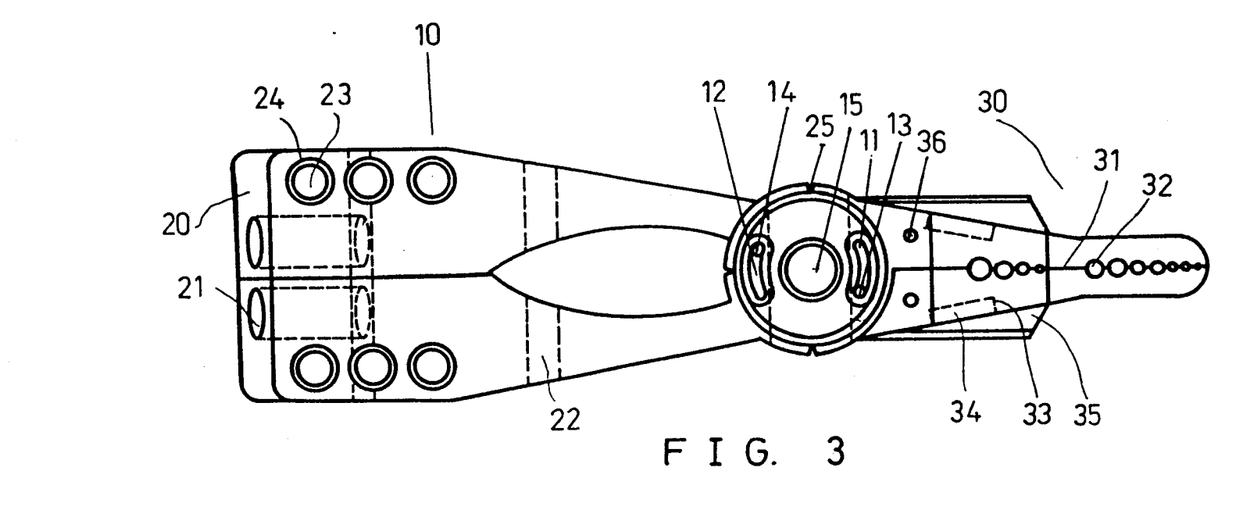
FIG. 3 shows a top sectional view of the nail clamping device of the present invention.

Referring to FIGS. 2 and 3, an improved nail clamping device of the present invention is shown to comprise mainly two handles 10 pivoted together such that they can be moved inwards and outwards. Each of the two handles 10 is provided at the front end thereof with a jaw 30 which is made integrally with the handle 10.

Figure 4:
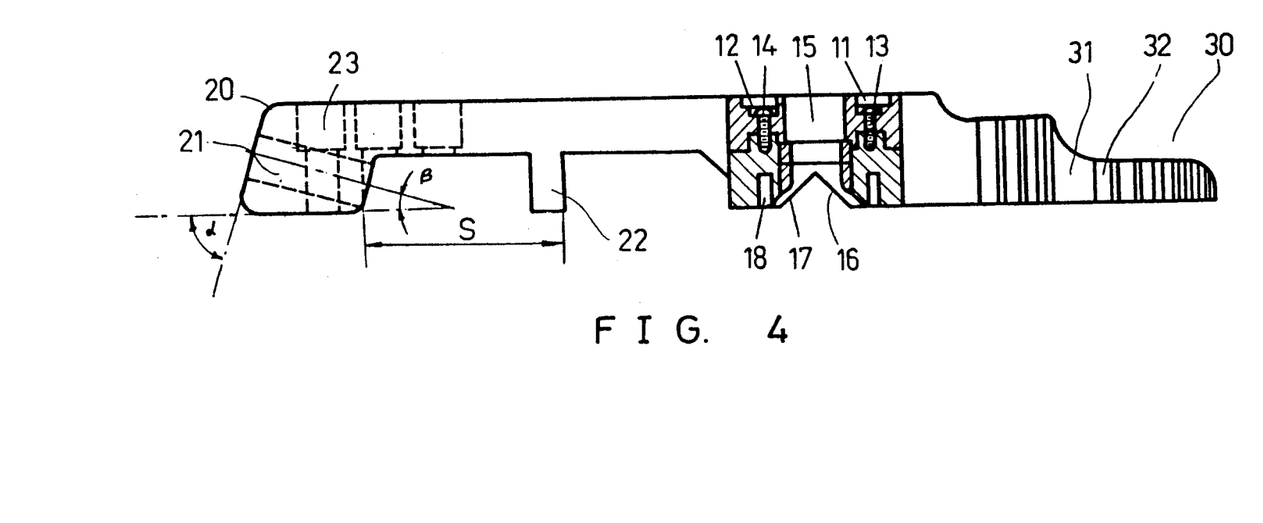
FIG. 4 shows a side sectional view of the nail clamping device of the present invention.
Figure 5:
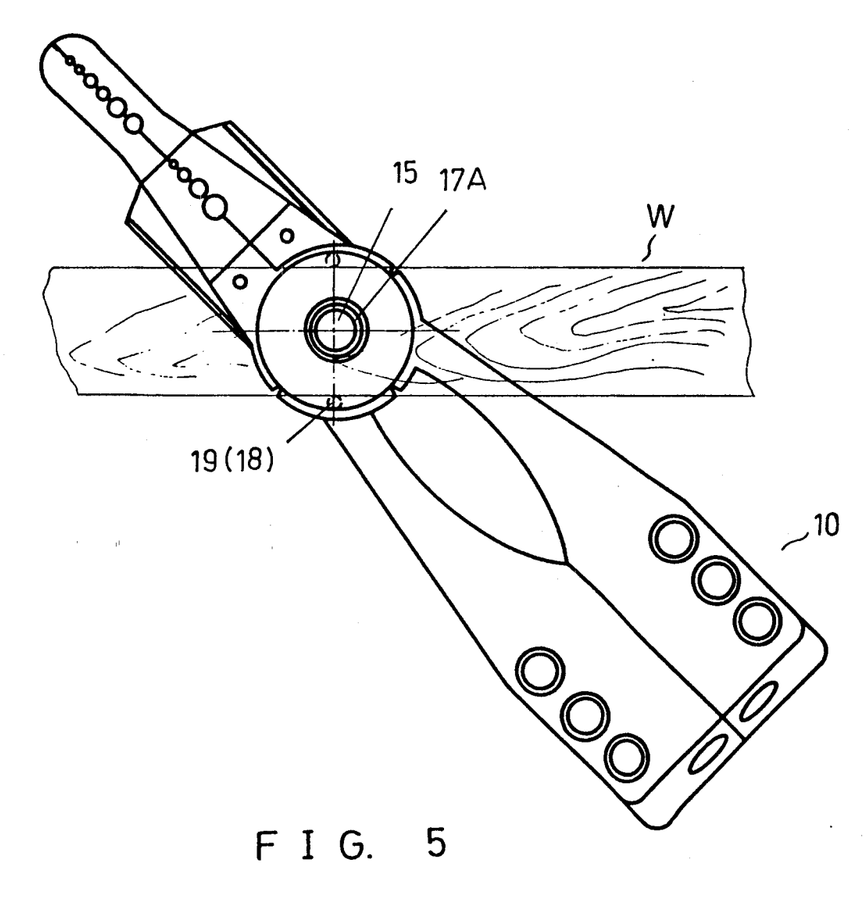
FIG. 5 is a schematic view showing the way that the center point of a work piece is located with the nail clamping device of the present invention.
Figure 7:
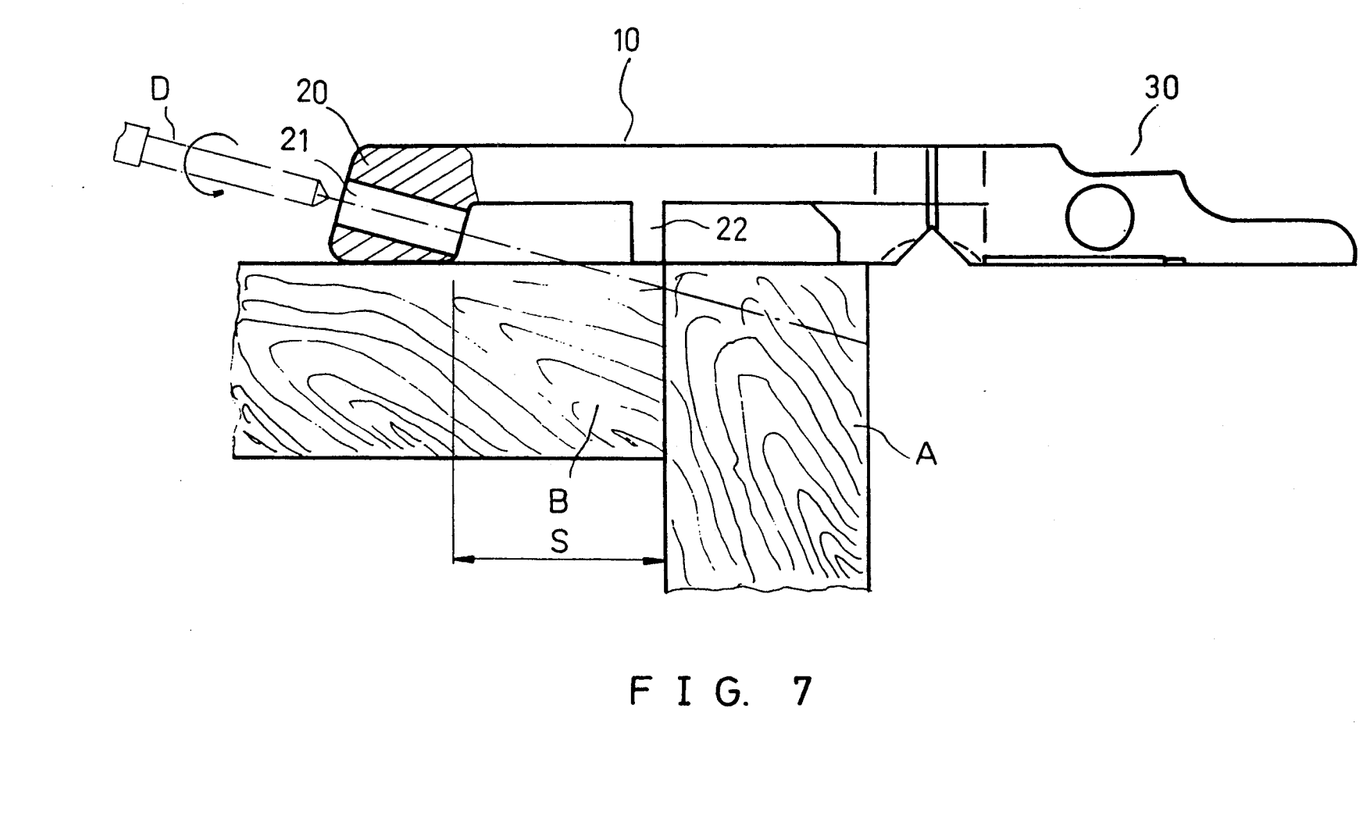
FIG. 7 is a schematic view showing the way that a 15-degree bevel hole is drilled by means of the nail clamping device of the present invention.
Figure 8:
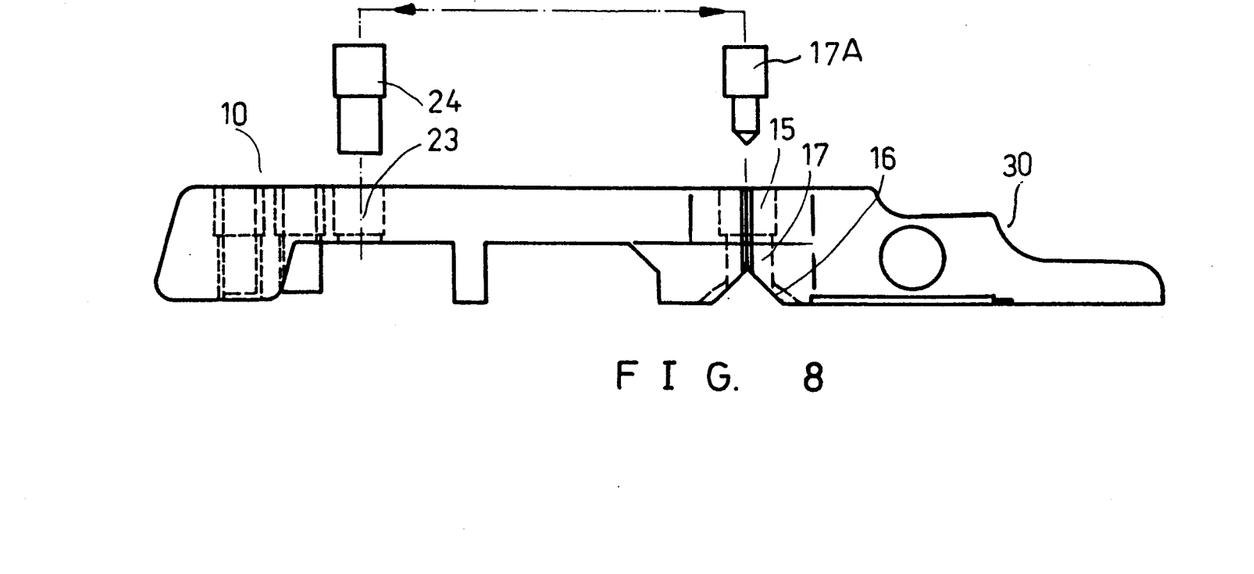
FIG. 8 is a schematic view showing the way that a guide sleeve of the present invention for use in making a vertical drilling is replaced and a centerpunch to mark.

As shown in FIGS. 3 and 4, the pivotal movements of the handles 10 are made possible by two oppositely-located arcuate guide slots 11 and 12 in conjunction with two bolts 13 and 14 which are disposed respectively and pivotally in the arcuate guide slots 11 and 12. Located between the two arcuate guide slots 11 and 12 is an axial hole 15 of a predetermined diameter, as shown in FIG. 3. The axial hole 15 has a bottom of trumpet-like construction and having at the center thereof an opening 16 forming a 90-degree angle for use in guiding and locating a work piece, especially a work piece having a diamond corner. As shown in FIG. 8, the axial hole 15 is provided axially with a metal guide sleeve 17 or centerpunch 17A, which is dimensioned to fit securely thereinto. The guide sleeve 17 or the centerpunch 17A is used for making a vertical drilling into the work piece and marking a center point or drawing a center line for the point of impact. There are two locating holes 18 situated near the bottom of the axial hole 15 such that the two locating holes 18 are distant equally from the circumference of the axial hole 15. Each of the two locating holes serves to receive therein a locating pin 19, as shown in FIG. 5. These two locating pins 19 serve to locate a work piece W so as to allow the workman to determine the center point of the work piece. Now referring to FIG. 8, a centerpunch 17A is shown to be disposed axially in the axial hole 15. The centerpunch 17A can be used to mark a point of draw lines on the surface of the work piece so as to determine the center point or centerline of the work piece. The rear ends of the two handles 10 are provided symmetrically and respectively with a guide slant 20 forming an angle "a" of 75 degrees, as shown in FIG. 4. The guide slant 20 is provided with a guide hole 21 perpendicular to the guide slant 20. The guide hole 21 has a center line forming with a horizontal line an angle "B" of 15 degrees, as shown in FIGS. 4 and 7, for use in guiding the workman to do a 15-degree (or B angle) drilling so as to fasten two members A and B of the work piece. The depth of the 15-degree drilling is ascertained by means of a wall 22 disposed on the underside of the handle 10 in such a manner that the wall 22 extends downwards perpendicularly, and that the wall 22 is separated from the guide slant 20 by a distance S, as shown in FIG. 4. In addition, each of the two handles 10 is provided in the top surface of the rear end thereof with three slots 23, as shown in FIG. 3. Each of the three slots has a guide sleeve 24 inserted thereinto. All three guide sleeves 24 are of different diameters. Furthermore, the axial hole 15 is provided diagonally in the circumference thereof with three notches 25 at each 90 degree for improving the locating of the center point.

The two jaws 30 are corresponding to each other in shape, which is similar to the beak of a duck. Each of the two jaws 30 is provided on the inner side thereof with a contact surface 31 having a plurality of nail clamping grooves 32 disposed longitudinally for gripping a nail. The two jaws 30 are further provided respectively in the outer side thereof with a recessed portion 33 of round construction. The two recessed portions 33 of the two jaws 30 are corresponding in location to each other. Each of the two recessed portions 33 contains therein a round magnet 34 of iron for attracting and locating a nail. Each of the two jaws 30 is further provided horizontally along the bottom edge of the outer side thereof with a scaled portion 35 for use as a measuring rule. Each of the two jaws 30 is still further provided in the upper side thereof with a pin hole 36 for use in receiving and locating the locating pin 19 which is removed from the locating hole 18.

Figure 6:
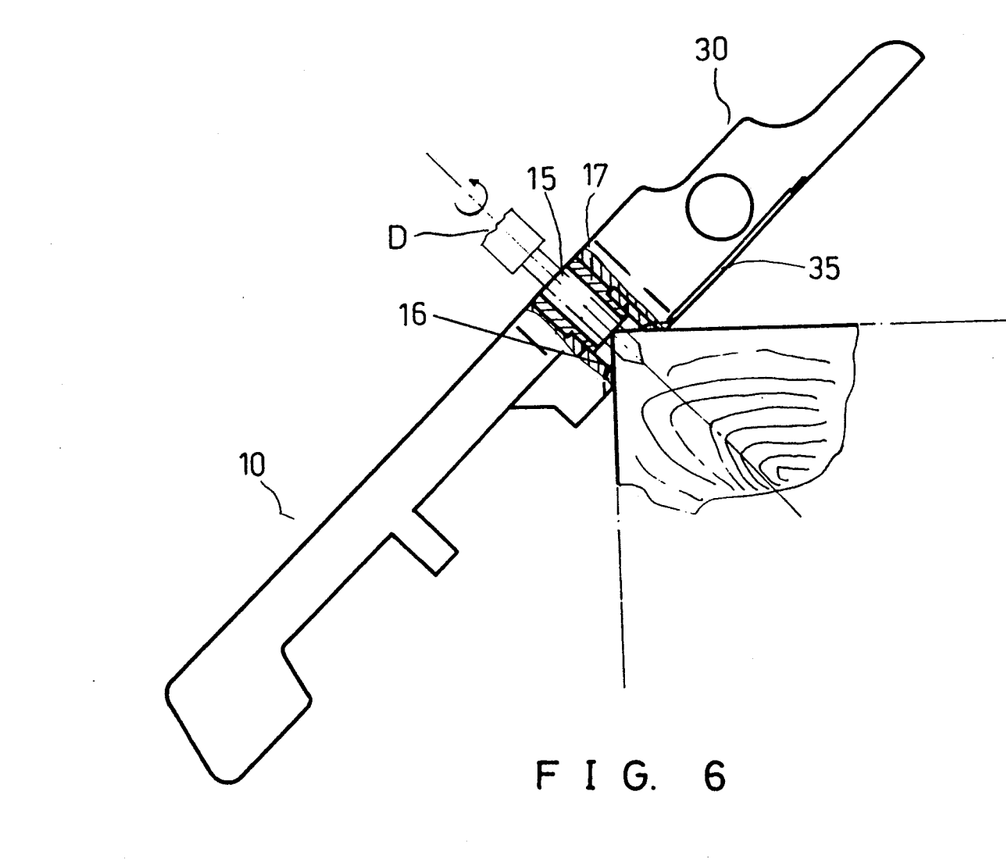
FIG. 6 is a schematic view showing the way that the drilling operation is done at a diamond corner by means of the nail clamping device of the present invention.
Figure 9:
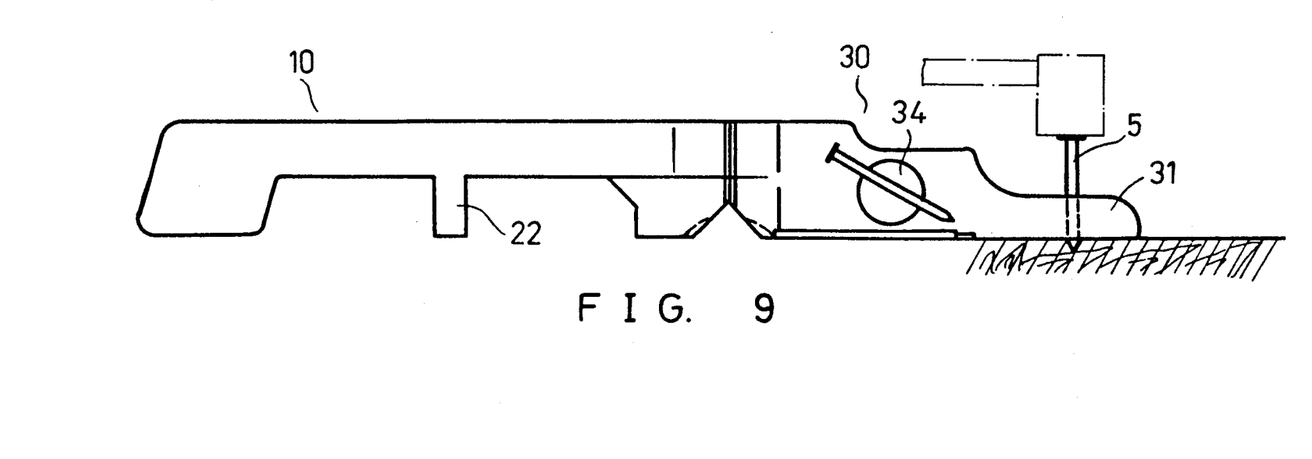
FIG. 9 is a schematic view showing the way that the nail clamping device of the present invention holds and attracts a nail.
Figure 10:
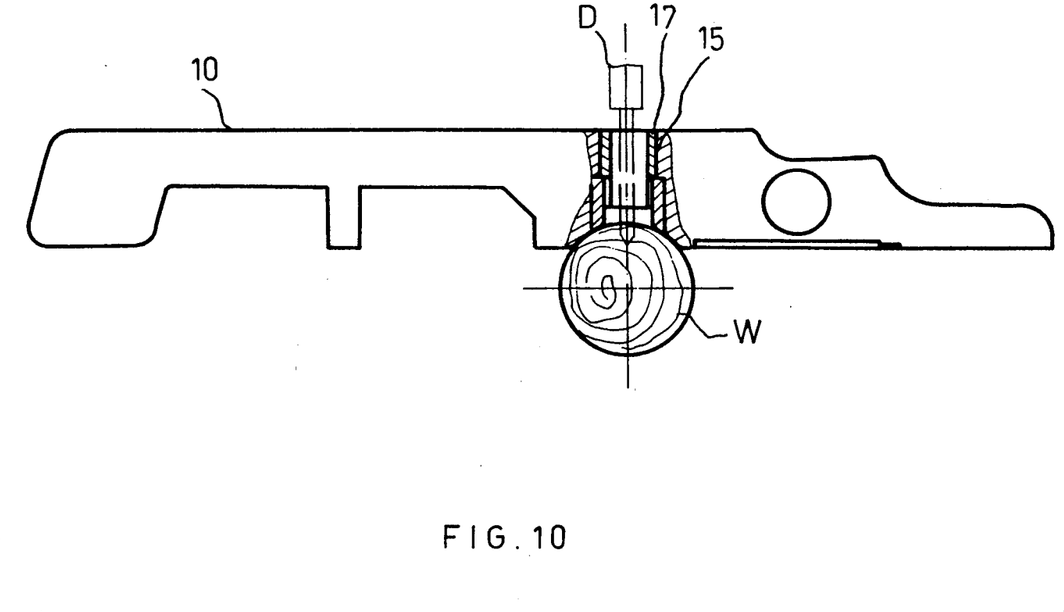
FIG. 10 is a schematic view showing the way that the nail clamping device of the present invention is used to drill a perpendicular hole in a work piece of cylindrical construction.

In addition to the function of clamping a nail, the improved nail clamping device of the present invention is capable of attracting the nail by means of the two magnets 34 of the two jaws 30, as shown in FIG. 9. In addition, the nail clamping device of the present invention may be used to survey the center point of the work piece. As illustrated in FIG. 5, upon causing the two handles 10 to close to make contact with each other, two locating pins 19 previously kept in the two pin holes 36 are taken out and then inserted into the two locating holes 18. Thereafter, a center point of the width of the work piece W can be sought within the range of the distance between the two locating pins 19 in view of the fact that the distance between the two upright locating pins 19 is always aligned with the axis of the axial hole 15. The work piece W can be located by means of the two locating pins 19 by reorienting the nail clamping device of the present invention. The two locating pins 19 are capable of holding two sides of the work piece W as the handles 10 are adjusted obliquely. Therefore, the center point of the work piece W can be easily found out through the axial hole 15. If a drilling job is called for, the guide sleeve 17 of an appropriate diameter is inserted into the axial hole 15, as shown in FIG. 8. The guide sleeve 24 kept in the slot 23 can be also replaced. The centerpunch 17A may be disposed in the axial hole 15 for marking the center point on the surface of the work piece, as shown in FIG. 8. The nail clamping device of the present invention can be also used by a workman to do a bevel drilling at a diamond corner of a work piece, as illustrated in FIG. 6. As described previously, the axial hole 15 is provided at the bottom thereof with the opening 16 forming an angle of 90 degrees, as shown in FIG. 6. As a result, a drill bit D received in the axial hole 15 can be used to drill a hole with precision at a diamond corner of the work piece. In addition, the axial hole 15 is provided with a trumpet-like bottom to facilitate the drilling of a work piece of cylindrical construction or spherical construction, as shown in FIG. 10. The nail clamping device of the present invention is further unique in that the two handles 10 are provided respectively with the wall 22, which may be used as a base to rest against the surface of an object intended to be drilled, while a workman uses his or her one hand to hold a power hand drill to drill a 15-degree bevel hole into the object via the guide hole 21 of the guide slant 20. The unique features of the present invention described above are all lacking in the nail clamping device of the prior art.

The embodiment of the present invention described above is to be regarded in all respects as merely illustrative and not restrictive. Accordingly, the present invention may be embodied in other specific forms without deviating from the spirit thereof. The present invention is therefore to be limited only by the scope of the following appended claims.

What is claimed is:

1. A nail clamping device comprising two handles of a length and pivoted together, with each of said two handles having at a front end thereof a jaw made integrally with said each of said two handles, each said jaw being provided on an inner side surface thereof with a plurality of nail clamping grooves disposed longitudinally in relation to each said jaw; wherein said each of said two handle is provided with an arcuate guide slot having a bolt disposed therein axially and movably, so as to enable said two handles to be pivoted together; wherein said two handles are provided respectively with an axial hole located between said two arcuate guide slots and provided therein with a guide sleeve of a diameter, said axial hole having at a center thereof an opening forming an angle of 90 degrees; wherein said two handles are further provided respectively with two locating holes distant equally from a circumference of said axial hole and provided therein respectively with a locating pin; and wherein said two handles are still further provided respectively and symmetrically with a 75-degree guide slant and a guide hole perpendicular to said guide slant so as to facilitate a 15-degree bevel drilling.

2. The nail clamping device according to claim 1 wherein said two handles are provided respectively on a bottom side thereof with a wall which is distant from said guide slant to provide a depth of said 15-degree bevel drilling.

3. The nail clamping device according to claim 1 wherein said two handles are provided respectively in a top side thereof with a plurality of slots so dimensioned variously as to receive therein a plurality of guide sleeves which are of various inner diameters and are axially and removably disposed in said slots.

4. The nail clamping device according to claim 1 wherein said two handles form a portion which is concentric with said axial hole and is provided with 3 notches.

5. The nail clamping device according to claim 1 wherein each said jaw is provided in an outer side surface thereof with a recessed portion, and a magnet securely received in said recessed portion.

6. The nail clamping device according to claim 1 wherein each said jaw is provided horizontally with a scaled portion for use as a measuring rule.

7. The nail clamping device according to claim 1 wherein said axial hole has a predetermined dimension to receive therein a centerpunch of tapered construction.

* * * * *